United States Patent
Komatsubara

(10) Patent No.: US 9,826,716 B2
(45) Date of Patent: Nov. 28, 2017

(54) ABSORBENT ARTICLE FOR PET

(71) Applicant: Unicharm Corporation, Shikokuchuo-shi, Ehime (JP)

(72) Inventor: Daisuke Komatsubara, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 15/511,718

(22) PCT Filed: Dec. 12, 2014

(86) PCT No.: PCT/JP2014/082926
§ 371 (c)(1),
(2) Date: Mar. 16, 2017

(87) PCT Pub. No.: WO2016/075842
PCT Pub. Date: May 19, 2016

(65) Prior Publication Data
US 2017/0280684 A1    Oct. 5, 2017

(30) Foreign Application Priority Data
Nov. 14, 2014 (JP) ................................. 2014-232181

(51) Int. Cl.
*A01K 23/00* (2006.01)

(52) U.S. Cl.
CPC ..................... *A01K 23/00* (2013.01)

(58) Field of Classification Search
CPC ...................... A01K 23/00; A61F 2013/15186
(Continued)

(56) References Cited

U.S. PATENT DOCUMENTS 2,575,165 A * 11/1951 Donovan ............... A41B 13/04
                                                        604/394
3,407,813 A * 10/1968 Grippo ................... A41B 13/04
                                                        604/398
(Continued)

FOREIGN PATENT DOCUMENTS

JP        6-70957 A      3/1994
JP    2007-167007 A     7/2007
(Continued)

OTHER PUBLICATIONS

Written Opinion of the ISA in PCT/JP2014/082926, dated Jan. 13, 2015.
(Continued)

Primary Examiner — Yvonne Abbott-Lewis
(74) Attorney, Agent, or Firm — Hauptman Ham, LLP

(57) ABSTRACT

Provided is an absorbent article for pets that can prevent side leakage of urine.
In an absorbent article for a pet including a liquid permeable inner layer sheet, a liquid impermeable outer layer sheet, and an absorbent core provided between the inner layer sheet and the outer layer sheet, the absorbent core is provided only on a region closer to a belly facing region than a cutting line in which the tail of the pet is inserted, the cutting line being positioned in an intermediate region, and a body facing surface of the inner layer sheet has an area, at least overlapping the absorbent core in plan view, in which a recessed-and-protruded region is positioned, the recessed-and-protruded region including ridges and grooves that are alternately arranged side by side in a lateral direction while extending in a longitudinal direction.

5 Claims, 7 Drawing Sheets

(58) Field of Classification Search
USPC ............ 119/850, 869, 868; 604/385.09, 393
See application file for complete search history.

(56) References Cited

U.S. PATENT DOCUMENTS

| | | | | |
|---|---|---|---|---|
| 4,813,949 A * | 3/1989 | O'Rourke | ............... | A01K 21/00 119/869 |
| 4,955,880 A * | 9/1990 | Rodriquez | ............. | A61F 13/74 604/393 |
| 4,996,949 A * | 3/1991 | Wunderman | .......... | A01K 23/00 119/850 |
| 5,368,585 A * | 11/1994 | Dokken | ............ | A61F 13/15268 604/358 |
| 5,613,959 A * | 3/1997 | Roessler | ........... | A61F 13/15211 604/364 |
| 5,662,640 A * | 9/1997 | Daniels | ................. | A01K 23/00 119/856 |
| 5,934,226 A * | 8/1999 | Moore | ................... | A01K 23/00 119/853 |
| 6,368,313 B1 * | 4/2002 | Howard | ................ | A01K 23/00 119/850 |
| 6,557,497 B1 * | 5/2003 | Milligan | ................ | A01K 23/00 119/850 |
| 6,675,745 B1 * | 1/2004 | Brewington | ........... | A01K 23/00 119/850 |
| 6,837,191 B2 * | 1/2005 | Brewington | ........... | A01K 23/00 119/850 |
| 7,174,860 B2 * | 2/2007 | Solomon | ................ | A01K 23/00 119/869 |
| 7,464,668 B2 * | 12/2008 | Brewington | ........... | A01K 23/00 119/850 |
| 8,439,000 B1 * | 5/2013 | Mehtupciu-Ionescu | ................. | A01K 23/00 119/850 |
| 8,656,866 B2 * | 2/2014 | Moharram | ............. | A01K 23/00 119/850 |
| 8,807,090 B1 * | 8/2014 | Potts | ...................... | A01K 23/00 119/850 |
| 2005/0154367 A1 * | 7/2005 | Ikegami | ................. | A01K 23/00 604/389 |
| 2007/0149941 A1 * | 6/2007 | Ikegami | ................. | A01K 23/00 604/385.09 |
| 2010/0229803 A1 * | 9/2010 | Meissner | ................ | A01K 23/00 119/868 |
| 2011/0209675 A1 * | 9/2011 | Esperon | ................. | A01K 23/00 119/868 |
| 2012/0245550 A1 * | 9/2012 | Sakaguchi | ............. | A61F 13/62 604/391 |
| 2015/0272713 A1 * | 10/2015 | Komatsubara | ......... | A01K 23/00 604/385.09 |
| 2015/0327516 A1 * | 11/2015 | Komatsubara | ......... | A01K 23/00 119/869 |
| 2015/0327517 A1 * | 11/2015 | Komatsubara | ......... | A01K 23/00 119/869 |
| 2016/0008183 A1 * | 1/2016 | Komatsubara | ......... | A01K 23/00 604/385.09 |

FOREIGN PATENT DOCUMENTS

| | | |
|---|---|---|
| JP | 2013-220286 A | 10/2013 |
| JP | 5576002 B1 | 8/2014 |

OTHER PUBLICATIONS

International Search Report in PCT/JP2014/082926, dated Jan. 13, 2015.

* cited by examiner

ABSORBENT ARTICLE FOR PET

RELATED APPLICATIONS

The present application is a National Phase of International Application Number PCT/JP2014/082926, filed Dec. 12, 2014, which claims priority to Japanese Application Number 2014-232181, filed Nov. 14, 2014.

TECHNICAL FIELD

The present disclosure relates to an absorbent article for absorbing excretions of pets such as dogs and cats.

BACKGROUND ART

Absorbent articles to be worn on the body of pets, such as cats and dogs, have conventionally been known. For example, PTL 1 discloses an absorbent article for pets that includes an absorbent chassis including a belly facing region; a back facing region; an intermediate region positioned between the back facing region; a liquid permeable inner layer sheet; a liquid impermeable outer layer sheet; and an absorbent core disposed between the inner and the outer layer sheets. The absorbent article has a body facing surface formed of the inner layer sheet with a flat surface.

CITATION LIST

Patent Literature

PTL 1: Japanese Unexamined Patent Application Publication No. 2007-167007 (JP2007-167007A)

SUMMARY OF INVENTION

Technical Problem

In the absorbent article for pets disclosed in PTL 1, the absorbent core extends in a longitudinal direction is a portion closer to a belly facing region side than a cutting line through which the tail of the pet is inserted. Thus, urine excreted in both ends of the absorbent core facing the urine opening of the pet may spread to a center portion positioned between both ends.

The center portion of the absorbent core is curved inward to conform with the hind legs of the pet and thus is relatively narrow. Thus, the urine moving on the surface from the end to the center portion might fail to be sufficiently absorbed and thus might cause side leakage.

An object of the present invention is to provide an absorbent article as a result of improving conventional absorbent articles for a pet for enabling urine excreted at an end of an absorbent core to move quickly in the longitudinal direction and thus preventing side leakage of the urine.

Solution to Problem

The present invention is directed to an absorbent article for a pet, the article having a longitudinal direction and a lateral direction and including: a body facing surface and a non-body facing surface opposite to each other, a belly facing region, a back facing region, an intermediate region positioned between the belly facing region and the back facing region in the longitudinal direction, a liquid permeable inner layer sheet, a liquid impermeable outer layer sheet, and an absorbent core provided between the inner layer sheet and the outer layer sheet.

In the absorbent article for a pet according to the present invention, the absorbent core is provided only in a portion closer to the belly facing region than a cutting line in which a tail of the pet is inserted, the cutting line being positioned in the intermediate region, and the body facing surface of the inner layer sheet has an area, at least overlapping the absorbent core in plan view, in which a recessed-and-protruded region is positioned, the recessed-and-protruded region including ridges and grooves that are alternately arranged side by side in the lateral direction while extending in the longitudinal direction.

Advantageous Effects of Invention

In the absorbent article for a pet according to at least one embodiment of the present invention, the body facing surface of the inner layer sheet has an area, at least overlapping the absorbent core in plan view, in which the ridges and the grooves that are alternately arranged side by side in the lateral direction while extending in the longitudinal direction. Thus, urine excreted in an area including the absorbent core moves in the longitudinal direction along the ridges and the grooves, and thus may be prevented from leaking out in the lateral direction.

BRIEF DESCRIPTION OF DRAWINGS

The drawings illustrate specific embodiments of the present invention, including optional and preferred embodiments as well as essential features of the invention.

DESCRIPTION OF EMBODIMENTS

Figure 1:
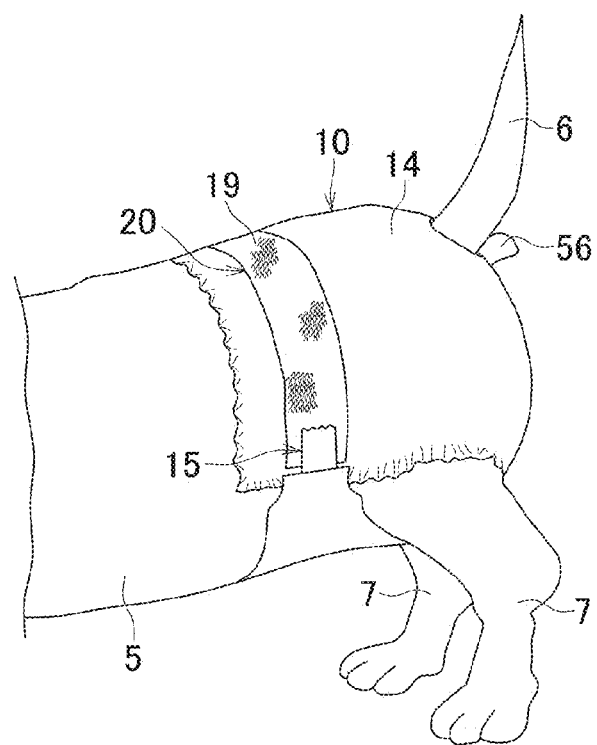
FIG. 1 is a perspective view illustrating a used state of an absorbent article for pets according to a first embodiment, illustrated as an example of an absorbent article for pets according to the present invention.

The embodiments described below relate to an absorbent article for pets illustrated in FIGS. 1 to 7 including both optional and preferred features as well as these features which are essential features of the present invention.

As illustrated in FIGS. 1 to 4, an absorbent article 10 for pets has a longitudinal direction Y and a lateral direction X orthogonal to each other, and includes a body facing surface facing the body of a pet 5 and a non-body facing surface on the opposite side. The absorbent article 10 includes: an absorbent chassis 14 including a belly facing region 11, a back facing region 12, and an intermediate region 13 positioned between the belly facing region 11 and the back facing region 12 in the longitudinal direction Y; and a pair of fastening tabs 15 (engagement members) that extend outward in the lateral direction X from both side edges of the belly facing region 11. The belly facing region 11 and the back facing region 12 covers a belly region and a hip region positioned on the forward side of hind legs 7 of the pet 5, and the intermediate region 13 entirely covers a buttocks region including a region between thighs of the hind legs 7. The absorbent article 10 has a longitudinal axis P bisecting the length in the lateral direction X, and a lateral axis Q bisecting the length in the longitudinal direction Y.

The fastening tabs 15 each have the body facing surface provided with a first fastening element 18 including a group of hooks of a mechanical fastener. The back facing region 12 has an outer surface on which a receiving portion 20, for detachably attaching the first fastening element 18 of the fastening tab 15, is attached with hot-melt adhesives (not illustrated). The receiving portion 20 includes a second fastening element 19 including a group of loops of the mechanical fastener extending in the lateral direction X. When the absorbent article 10 is worn, a waist opening and a pair of leg openings are defined with the first fastening element 18 of the pair of fastening tab 15 engaged with the second fastening element 19 on the second outer surface of the back facing region 12.

<Absorbent Chassis>

The absorbent chassis 14 includes: first and second end edges 14a and 14b on opposite sides in the longitudinal direction Y and extend in the lateral direction X; and both side edges (leg opening edges) 14c with a curved form that are positioned between the first and the second end edges 14a and 14b and extend in the longitudinal direction. The absorbent chassis 14 further includes: a liquid permeable inner layer sheet 22 positioned on a body facing surface side; a liquid impermeable outer layer sheet 23 that defines an outer shape of the absorbent chassis 14 and is formed of breathable plastic films, fiber nonwoven fabrics, or laminate sheets of these; and a liquid absorbent layer 25 provided between the inner and the outer layer sheets 22 and 23. The inner layer sheet 22 and the outer layer sheet 23 extend from outer circumference edges of the liquid absorbent layer 25, and have the extended portions bonded to each other with hot-melt adhesives (not illustrated) applied on the inner surface of at least one of the sheets 22 and 23. A leakage barrier sheet 26, formed of a liquid impermeable and breathable plastic film, is disposed on a non-body facing surface side of the liquid absorbent layer 25 between the inner layer sheet 22 and the outer layer sheet 23, and is fixed with hot-melt adhesives applied on the inner surface of at least one of the sheets 22 and 23.

The liquid absorbent layer 25 includes: a semi-rigid absorbent core 51 positioned in the belly facing region 11 and the intermediate region 13; and a core wrap sheet 52 wrapping the absorbent core 51. The absorbent core 51 is made of a mixture containing particles of what is called high-absorbent polymer (SAP), which is water insoluble and has water absorbing power of at least ten times larger than its mass, wood fluff pulp, and a small amount of optional thermoplastic fibers. The core wrap sheet 52 is made of hydrophilic and liquid diffusive nonwoven fabrics or tissue paper. The core wrap sheet 52 is bonded to the inner layer sheet 22 and/or the leakage barrier sheet 26 with hot-melt adhesives.

Figure 2:
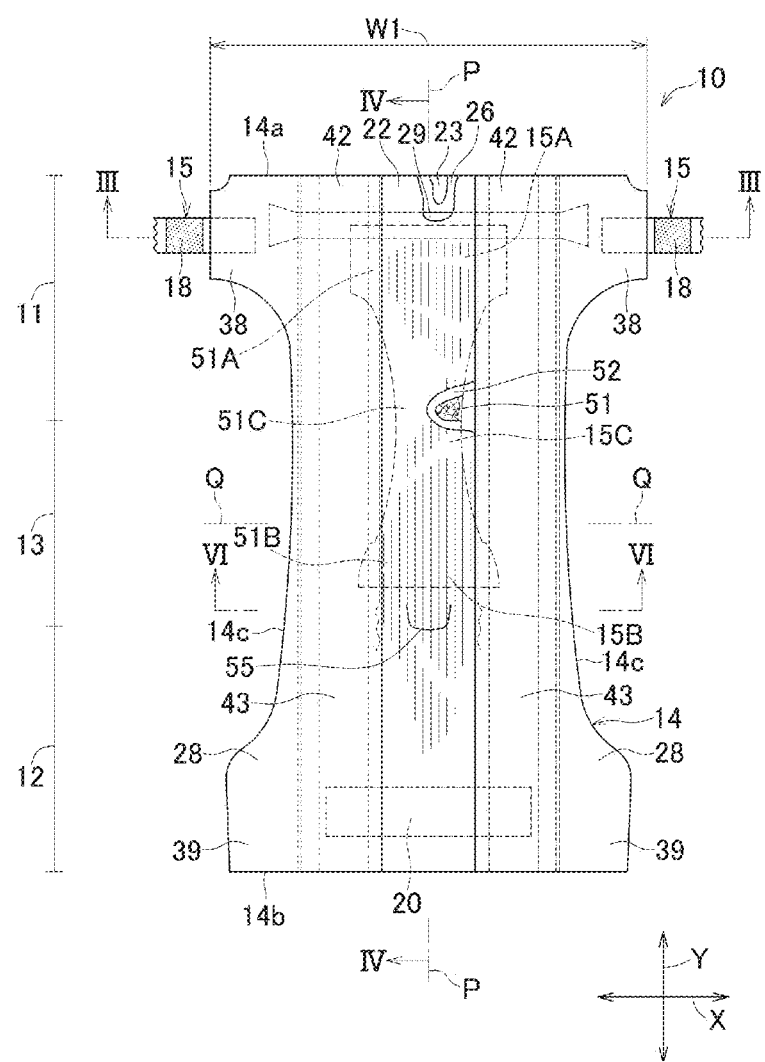
FIG. 2 is a partially cutaway development plan view of the absorbent article extended in a longitudinal direction and a lateral direction until each elastic member is extended to the maximum (such that gathering caused by the contraction effect of the elastic material is straightened out).

As illustrated in FIG. 2, the absorbent core 51 includes: first and second ends 51A and 51B separated from each other and opposite to each other in the longitudinal direction Y; and a intermediate portion 51C positioned between the first and the second ends 51A and 51B. The first end 51A is positioned on the side of the belly facing region 11, whereas the second end 51B is positioned on the side of the back facing region 12. The intermediate portion 51C of the absorbent core 51 has both side edges inwardly curved. Thus, the intermediate portion 51C is narrower than the first and the second ends 51A and 51B.

In the present embodiment, the liquid absorbent layer 25 is not disposed in the back facing region 12. The pet 5 has an urination portion positioned closer to the belly than a tail 6, and thus the urine never flows to the back side of the pet 5 in a normal standing state. Thus, the liquid absorbent layer 25 only needs to be arranged at least in the intermediate region 13 facing the urination portion and in and the belly facing region 11. All things considered, the unique arrangement of the liquid absorbent layer 25 described above may be employed to achieve a higher absorption efficiency of the liquid absorbent layer 25 and a lower manufacturing cost, compared with the case where the liquid absorbent layer 25 extends to the back facing region 12 involving no urine excretion. Furthermore, the back facing region 12 may be prevented from being starchy by the liquid absorbent layer 25, whereby ventilation on the back facing region 12 may be improved to prevent humidity.

Figure 3:
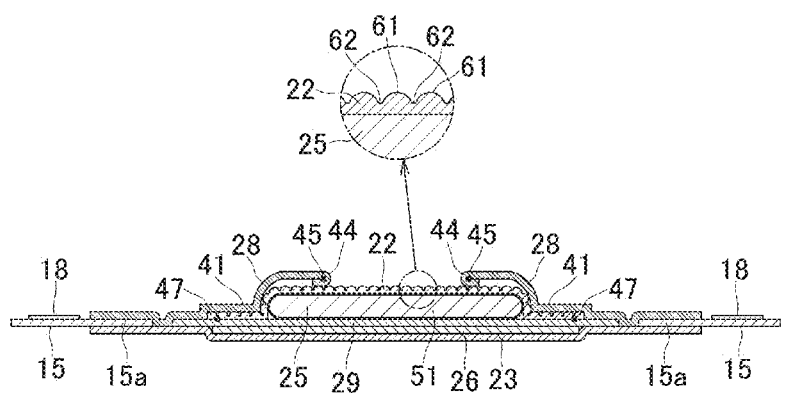
FIG. 3 is a schematic cross-section view along line III-III in FIG. 2.
Figure 6:
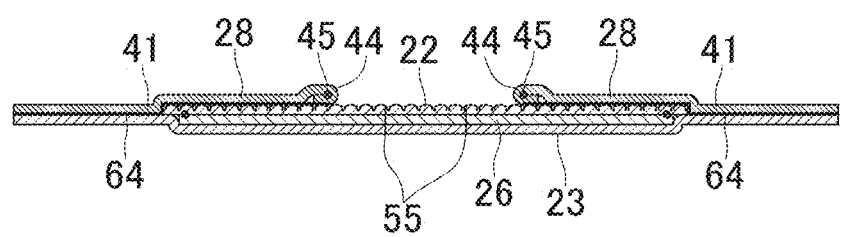
FIG. 6 is a schematic cross-section view along line VI-VI in FIG. 2.

As illustrated in FIG. 2, FIG. 3, and FIG. 6, the inner layer sheet 22 is formed of fiber nonwoven fabrics, and includes a recessed-and-protruded region 60 including: a plurality of ridges 61 that extend in the longitudinal direction Y and are arranged side by side in the lateral direction X; and a plurality of grooves 62 extending in the longitudinal direction Y and are each positioned between adjacent ones of the ridges 61. The recessed-and-protruded region 60 is positioned in an area at least overlapping with the absorbent layer 25 in plan view. The inner layer sheet 22 according to the present embodiment is a rectangular sheet extending in the longitudinal direction between the first end edge 14a and the second end edge 14b. The recessed-and-protruded region 60 is formed entirely over the body facing surface of the inner layer sheet 22 with the ridges 61 and the grooves 62 continuously extending between the first end edge 14a and the second end edge 14b.

The ridges 61 and the grooves 62 on the inner layer sheet 22 may be formed for example as follows: Specifically, a plurality of nozzles, arranged along a cross-machine direction, continuously eject fluid such as a heater jet air, jet water, or jet steam onto a fiber web, for forming the inner layer sheet 22, conveyed in a machine direction while being placed on a conveyance belt. The grooves 62 are formed on regions blown with the fluid in the fiber web, on which the fluid has been blown, and the ridges 61 are formed on both sides of each of the grooves 62. The inner layer sheet 22 has fiber orientation along the longitudinal direction Y in which the recessed-and-protruded region 60 extends. The fiber orientation indicates a direction in which 50% of the fibers forming the inner layer sheet 22 or more are oriented. The movement of the urine or the like in the longitudinal direction Y is facilitated with the fiber orientation of the fibers orientated in the longitudinal direction Y. The inner layer sheet 22 has a fiber density in a range of 15 to 35 g/cm$^3$, and the groove 62 has a higher density than the ridge 61.

As illustrated in FIG. 2 and FIG. 3, a pair of barrier cuff sheets 28, symmetrically positioned about the longitudinal axis P, are attached on the body facing surface of the inner layer sheet 22 on the outer sides of the liquid absorbent layer 25 in the lateral direction X. Side elastic members 47, in a form of one or a plurality of strands or strings extending in the longitudinal direction Y, are attached to the outer sides of both side edges of the leakage barrier sheet 26 in the lateral direction X. The side elastic members 47 are each attached contractibly between a proximal portion 41 of the barrier cuff sheet 28 and a corresponding one of both side portions of the outer layer sheet 23, that is, between the proximal portion 41 and a corresponding one of both side portions of the inner layer sheet 22, with hot-melt adhesives (not illustrated).

The outer layer sheet 23 and the barrier cuff sheet 28 extend outward in the lateral direction X beyond both side edges of the inner layer sheet 22 and the leakage barrier sheet 26 in the belly and the back facing regions 11 and 12. The extended portions overlap with each other to form a belly side flap 38 and a back side flap 39. Both side edges of the outer layer sheet 23 and the barrier cuff sheet 28, forming the belly side flap 38, have a fixed portion 15a of the pair of fastening tabs 15 fixed therebetween with hot-melt adhesives (not illustrated) applied on the inner surfaces of the sheets 23 and 28.

The fastening system including the first fastening element 18 and the second fastening element 19 may be formed by applying adhesives instead of using the group of hooks as the first fastening element 18, as long as a predetermined peel strength may be ensured. In such an instance, the first fastening element 18 may have a surface coated with a separator coated with silicone, so that the first fastening element 18 may be protected. The fastening tab 15 includes abase material sheet preferably formed of sheet materials with relatively high rigidity and tensile strength such as plastic sheets, fiber nonwoven fabrics, laminates of these, or craft paper. The first fastening element 18, provided on the belly side flap 38, may be directly and detachably engaged with the second fastening element 19, without using the fastening tabs 15, as long as desired effects of the present invention may be obtained.

As illustrated in FIG. 3, the barrier cuff sheet 28 includes: the proximal regions 41 forming part of both sides of the absorbent chassis 14; forward end fixing members 42 and rear end fixing members 43 fixed to skin facing surfaces of the inner layer sheet 22 and the outer layer sheet 23 in the belly and the back facing regions 11 and 12; distal portions (free ends) 44 formed by folding the inner side edges of the barrier cuff sheet 28 inward, and extend in the longitudinal direction Y between the front and the rear end fixing members. A cuff elastic member 45, in a form of one or a plurality of strands or strings extending in the longitudinal direction Y, is attached to each of the distal regions 44, in a stretched state and contractibly. When the absorbent article 10 is worn, the distal portions 44 are spaced away from the body facing surface of the inner layer sheet 22 by the contraction effect of the cuff elastic member 45, whereby a pair of leak proof cuffs for preventing side leak of the excretion are formed.

In the present embodiment, the cuff elastic member 45 and the side elastic member 47 are each an elastic string or strand material, with a fineness of 280 to 500 dtex, attached contractibly while being stretched to be 2.0 to 3.0 (preferably 2.2 to 2.5) times longer than the original length. A space (pitch) between a plurality of elastic members may be appropriately set based on contractile force required for each of the elastic members 45 and 47. The elastic materials forming the elastic members 45 and 47 may have the fineness and the extendibility different from one another instead of being uniform.

In the present embodiment, the side elastic member 47 continuously extends in the longitudinal direction Y entirely over the absorbent chassis 14, that is, between the first end edge 14a and the second end edge 14b. The cuff elastic members 45 extend toward the back facing region 12 from the first end edge 14a beyond the liquid absorbent layer 25. The side elastic member 43 and the cuff elastic member 44 each include: an extending-contracting function region actually exerting flexibility; and a non-extending-contracting function region performing what is known as snapback (a non-fixed region as a region of the elastic member that is not fixed contracts to return to a region closed to a bonded end region fixed to the sheet) and actually exerting no flexibility.

As illustrated in FIG. 2 and FIG. 3, a belly-side elastic member 29 in a strip form is attached to the belly facing region 11 of the absorbent chassis 14 and extends in the lateral direction X between the inner layer sheet 22 and the leakage barrier sheet 26. The belly-side elastic member 29 is formed of an elastic member in a form of a rubber thread, a flat rubber/urethane foam, or a ribbon made of natural or synthetic rubber or polyurethane foam, and is a flat elastic made of polyurethane foam in the present embodiment. The belly-side elastic member 29 preferably has a predetermined width (the length in the longitudinal direction Y) to fit the body while applying contractile force over a relatively large area of the belly facing region 11. Specifically, the length of the belly-side elastic member 29 (the length in the lateral direction X) is about 55 to 90% of a width (the length in the lateral direction X) W1 of the belly facing region 11 of the absorbent chassis 14. The width of the center portion of the belly-side elastic member 29 (the length in the longitudinal direction Y) is about 20 to 40 mm. The side elastic member 47 has ends that overlap both ends of the belly-side elastic member 29 in plan view, and are provided between the belly-side elastic member 29 and the inner layer sheet 22 while being bonded to the inner layer sheet 22 without being bonded to the belly-side elastic member 29.

Figure 4:
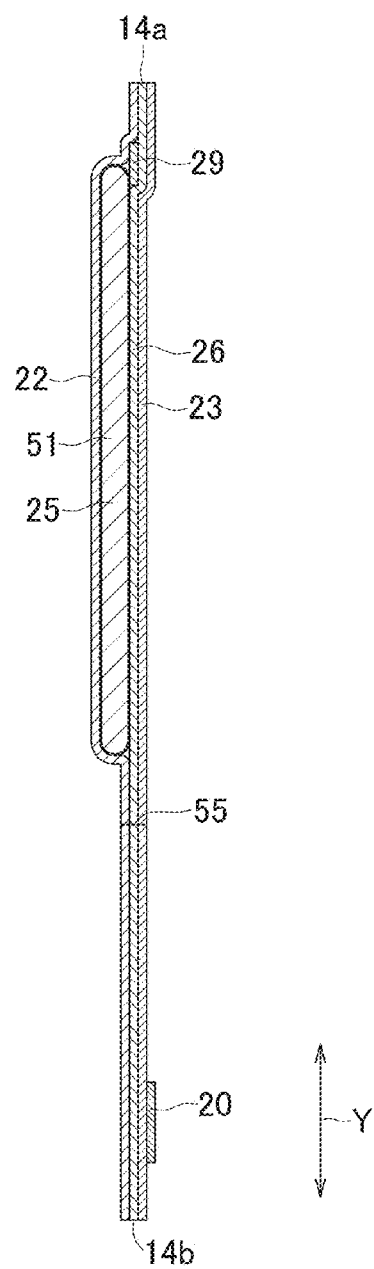
FIG. 4 is a schematic cross-section view along line IV-IV in FIG. 2.
Figure 5:
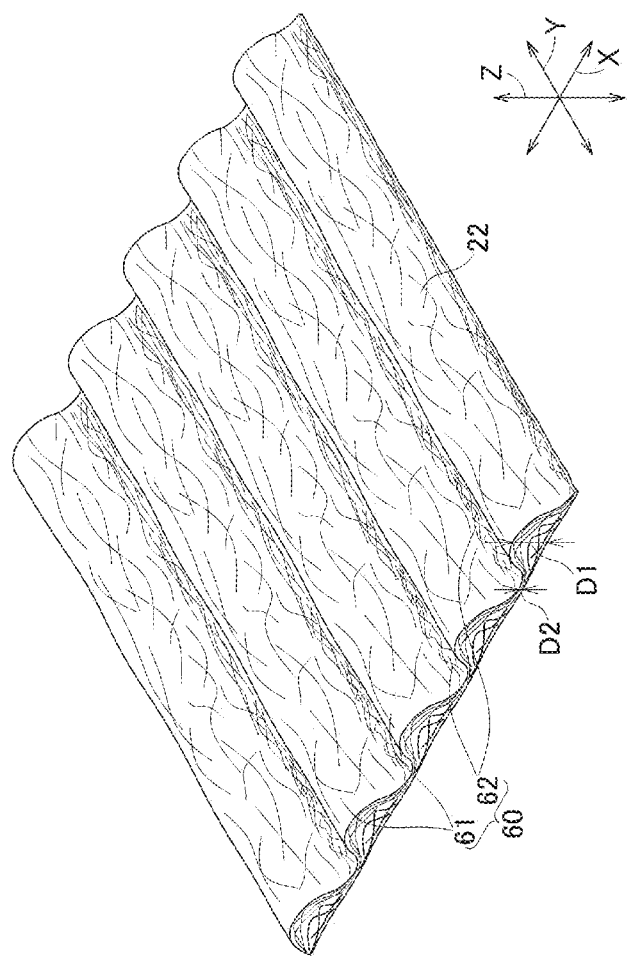
FIG. 5 is a partially enlarged perspective view of an inner layer sheet.

As illustrated in FIG. 3 to FIG. 5, the belly-side elastic members 29 overlap with the absorbent core 51 in plan view and extend outward in the lateral direction X from both side edges of the absorbent core 51. In the present embodiment, the belly-side elastic member 29 has a non-body facing surface side fixed to the leakage barrier sheet 26 and the outer layer sheet 23 through bonded portions 40 that are formed by applying hot-melt adhesives and are continuously arranged, that is, arranged while being spaced apart from each other in the lateral direction X. The belly-side elastic member 29 has a body facing surface side not fixed to the absorbent core 51 or the inner layer sheet 22.

When the absorbent article 10 is worn, the first end 51A and the second end 51B of the absorbent core 51 respectively face the male urine opening and female urine opening, and each function as a main absorbent portion that directly absorbs the excreted urine. An intermediate portion 51C between functions as a sub absorbent portion to which the urine absorbed by the first end 51A or the second end 51B spreads. The intermediate portion 51C, functioning as the sub absorbent portion, has both side edges curved inward to conform with the hind legs, and thus is narrower than the first and the second ends 51A and 52B. Thus, when the urine retenting on the surfaces of the first and the second ends 51A and 52B moves to the intermediate portion 51C, the side leakage of the urine from both sides of the intermediate portion 51C might occur. In particular, when the amount of urine to be absorbed in one of the side portions of the intermediate portion 51C in the longitudinal direction Y exceeds the absorption capacity, the side leakage might occur before the urine spreads to the center portion or the other end of the intermediate portion 51C.

In the absorbent article 10 according to the present embodiment, the recessed-and-protruded region 60, including the ridges 61 and the grooves 62 alternately arranged side by side in the lateral direction X while extending in the longitudinal direction Y, is formed at least in the area of the body facing surface (front surface) of the inner layer sheet 22 overlapping with the absorbent core 51 in plan view. Thus, the urine excreted in the first end 51A or the second end 51B may quickly move and spread to the intermediate portion 51C or to the other opposite end in the longitudinal direction Y. With the urine moving quickly on the surface of the inner layer sheet 22 in the longitudinal direction Y as described above, the side leakage from both sides of the absorbent core 51 may be prevented, and the urine may be absorbed over the entire area of the absorbent core 51. All things considered, higher overall absorption efficiency may be achieved compared with the configuration in which the urine does not move quickly in the longitudinal direction Y and a portion absorbing no urine is formed. In the recessed-and-protruded region 60, only the ridges come into contact with the body, and thus the area to be in contact with the body is smaller compared with a flat sheet. Thus, a good wearing feeling may be achieved with diaper rash prevented because the contact area of the inner layer sheet 22 being wet after the urination is relatively small. The ridges 61 and the grooves 62 continuously extend between the first end edge 14a and the second end edge 14b, whereby higher breathability may be achieved between the first end edge 14a and the second end edge 14b compared with a sheet with a flat body facing surface.

In the recessed-and-protruded region 60, the ridge 61 has a lower fiber density than the groove 62. Thus, urine excreted on the surface of the inner layer sheet 22 is concentrated in the groove 62 under capillary, whereby the movement of the urine in the longitudinal direction Y along the groove is facilitated. With the urine drawn into the groove 62 with high fiber density, the urine may be quickly absorbed in the liquid absorbent layer 25. In particular, when the tail is inserted through the opening and the belly facing region and/or back facing region is fit to the body for putting on the absorbent article, the belly facing region might hang down to interfere with the fastening operation. In view of this, the inner layer sheet 22 with the surface provided with the recessed-and-protruded region 60 extends over the entire area of the absorbent article 10 in the longitudinal direction Y. Thus, a relatively high rigidity in the lateral direction X may be achieved to prevent the belly facing region 11 from hanging down, whereby the fastening operation may be relatively easily performed. The belly-side elastic member 29, disposed to be contractible in the lateral direction X, might have the contractility inhibited when being fixed to the inner layer sheet 22 having a relatively high rigidity in the lateral direction X. Still, the belly-side elastic member 29 is not fixed to the inner layer sheet 22, and is fixed to the leakage barrier sheet 26 and the outer layer sheet 23, whereby the contractility is not inhibited.

To achieve the technical effect of the recessed-and-protruded region 60 on the inner layer sheet 22, a height (a length in a height direction Z) D1 at the thickest portion of the ridge 61 is preferably about 1.2 to 1.7 times longer than a height D2 of the groove 62 (see FIG. 5). When the length of the former exceeds a length that is 1.7 times longer than the latter, the groove 62 might be too deep to result in uncomfortableness when the sheet is in contact with the body. When the former is shorter than a length that is 1.2 times the latter, the groove 62 might be relatively too shallow to achieve the effect obtained by forming the recessed-and-protruded region 60 on the surface of the inner layer sheet 22 as described above.

As illustrated in FIG. 2, a cutting line (perforation) 55, for forming the opening (insertion hole) in which the tail 6 of the pet 5 is inserted, is provided closer to the back facing region 12 than the liquid absorbent layer 25. The cutting line 55 is formed through the inner layer sheet 22, the leakage barrier sheet 26, and the outer layer sheet 23 overlapping each other in plan view. The cutting line 55 partially extends in the lateral direction X in such a manner as to cross a plurality of ridges 61 and a plurality of grooves 62. In the present embodiment, the cutting line 55 has a substantially U-shape, and extends in the lateral direction X in such a manner that a bottom portion of the U shape crosses a plurality of ridge 61 and the groove 62.

The opening is formed when the absorbent chassis 14 is partially cut along the cutting line 55, and a tongue piece 56 (see FIG. 1) in a state where the sheets 22, 23, and 26 are bonded or not bonded is outwardly folded. As described above, the cutting line 55 partially extends in the lateral direction X in such a manner as to cross the ridges 61 and the grooves 62 in the recessed-and-protruded region 60. Thus, the cutting line 55 is not accidentally separated when the diaper 10 is in transit or in storage. The opening is preferably large enough to face the anus, so as to be usable not only for inserting the tail 6 but also for discharging the excretion (feces) excreted from the anus positioned immediately below the tail 6. With the opening used for inserting the tail 6 and for exposing the anus, the excretion contained in the absorbent chassis 14 may be prevented from being entangled with the fur. The tongue piece 56 may be separated (cutoff) from the absorbent chassis 14, and thus the excretion excreted from the anus may be prevented from attaching to the tongue piece 56.

As illustrated in FIG. 2 and FIG. 6, the rear end fixing member 43 of the barrier cuff sheet 28 extends between the second end edge 14b and a portion close to the end edge of the absorbent core 51 on the back facing region 12. In the back facing region 12, the barrier cuff sheet 28 has an entire area on the non-body facing surface bonded to the inner and outer layer sheets 22 and 23 through a bonding portion 64, and the inner layer sheet 22 is positioned between the pair of rear end fixing members 43 spaced apart from each other in the lateral direction X. The inner layer sheet 22 with the surface provided with the recessed-and-protruded region 60 is exposed through a region between the rear end fixing members 43 of the barrier sheets 28 to be directly in contact with the body of the pet 5. Thus, an appropriate frictional resistance may be provided between the article and the body compared with when the surface is smooth, whereby anti-slip effect may be obtained. A boundary portion between the rear end fixing member 43 and the inner layer sheet 22 might have a level difference, owing to the sheet thickness of the barrier cuff sheet 28, leading to an uncomfortable feeling when being in contact with the body. Still, with the recessed-and-protruded region 60 provided between the pair of rear end fixing members 43, the pet is less likely to feel the uncomfortableness. The back facing region 12 in contact with the body of the pet 5 is more likely to lead to fallen fur compared with the belly facing region 11. Still, with the recessed-and-protruded region 60 positioned at the surface to be in contact with the body, the fallen fur is likely to enter between the ridges 61 with a low fiber density, whereby the fallen fur may be held in the groove 62 with high fiber density.

Figure 7:
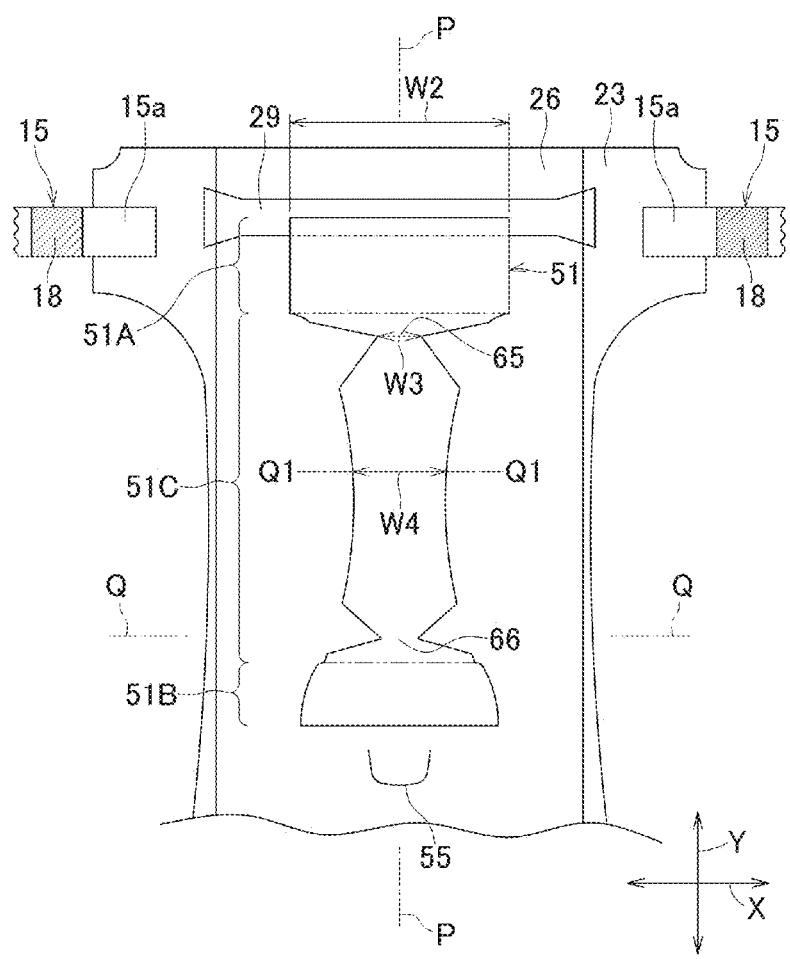
FIG. 7 is a plan view illustrating a belly facing region and an intermediate region in an absorbent article for pets according to a modification in a state where an inner layer sheet and barrier cuff sheets are removed, as viewed from a body facing surfaces side.

FIG. 7 is a diagram illustrating an example of a modification of the absorbent article 10, and is a plan view of the belly facing region 11 and the intermediate region 12 as viewed from the body facing surface side, in a state where the inner layer sheet 22 and the barrier cuff sheets 28 are removed from the absorbent chassis 14. In this modification, in the liquid absorbent layer 25, a first narrow portion 65 and a second narrow portion 66 are respectively positioned on sides of the first and the second ends 51A and 51B of the intermediate portion 51C of the absorbent core 51. The first and the second narrow portions 65 and 66 each have both side edges sharply recessed toward the longitudinal axis P. Thus, the liquid absorbent layer 25 has a small length in the lateral direction X locally at the first and the second narrow portions 65 and 66.

For example, both side edges of the absorbent core 51 may entirely have a linear shape or a gentle curved shape. In such an instance, the first and the second ends 51A and 51B, which are relatively wide, are pulled toward the intermediate portion 51C by the forward and reward movement of the hind legs 7 when the pet walks, and might reach the movable range of the hind legs 7 to be in contact with the hind legs 7. As a result, the movement of the hind legs 7 is prevented. In the present embodiment, the first and the second narrow portions 65 and 66 are positioned in the area in the intermediate portion 51C adjacent to the first and the second ends 51A and 51B. Thus, the absorbent core 51 are locally narrow so that the force applied along both side edge of the liquid absorbent layer 25 to pull the liquid absorbent layer 25 in the longitudinal direction Y is interrupted and to be not transmitted, whereby less linkage is achieved. Thus, when the article is worn, the movement of the hind legs 7 is not prevented by the displacement of the liquid absorbent layer 25 caused by the movement of the hind legs 7 or the body. The inner layer sheet 22 with the recessed-and-protruded region 60 extends over the entire area of the liquid absorbent layer 25 to achieve relatively high rigidity in the lateral direction X. Thus, even when the absorbent core 51 is provided with the first and the second narrow portions 65 and 66 with relatively low rigidity in the lateral direction X, the absorbent core 51 may be prevented from folding along the lateral direction X at the portions. All things considered, the liquid absorbent core 51 may be maintained to be in a state of being continuously extending between the first end 51A and the second end 51B.

To achieve the technical effects, preferably, the relationship W2≥W4>W3 holds true, where W2 is the length of the first end 51A and/or the second end 51B in the lateral direction X, W3 is the length of the narrowest portion of the first and the second narrow portions 61 and 62 in the lateral direction X, and W4 is the length of the intermediate portion 51C on the lateral axis Q1, at the lateral axis Q bisecting the length of the absorbent core 51 in the longitudinal direction Y, in the lateral direction X. At least one of the first and the second narrow portions 65 and 66 may be formed, and the narrow portion may have shapes other than the sharp triangle such as a curved shape or a shape of a slit extending in the lateral direction X.

In addition to the materials described herein, any known materials usually used in this technical field may be used for the members included in the absorbent article 10 with no limitation unless otherwise specified. Such terms as "first" and "second" as used herein are merely used for distinguishing similar elements, positions, or the like from one another.

The disclosure above relating to the present invention may be at least arranged as follows:

An absorbent article for a pet has a longitudinal direction and a lateral direction and includes: a body facing surface and a non-body facing surface opposite to each other; a belly facing region; a back facing region; an intermediate region positioned between the belly facing region and the back facing region in the longitudinal direction; a liquid permeable inner layer sheet; a liquid impermeable outer layer sheet; and an absorbent core provided between the inner layer sheet and the outer layer sheet, the absorbent core is provided only on a side closer to the belly facing region than a cutting line in which a tail of the pet is inserted, the cutting line positioning in the intermediate region, and the body facing surface of the inner layer sheet has an area, at least overlapping the absorbent core in plan view, in which a recessed-and-protruded region is positioned, the recessed-and-protruded region including ridges and grooves that are alternately arranged side by side in the lateral direction while extending in the longitudinal direction.

The present invention disclosed in paragraph 0039 may at least include the following embodiments: These embodiments may be taken in isolation or in combination.

(1) The recessed-and-protruded region extends between one end edge and another end edge of the absorbent article in the longitudinal direction.

(2) The inner layer sheet is formed of fiber nonwoven fabrics, and the ridges have a lower fiber density than the grooves.

(3) The cutting line partially extends in such a manner as to cross a plurality of ridges and a plurality of grooves.

(4) The absorbent article further includes a pair of barrier cuff sheets positioned on the body facing surface in the inner layer sheet, and are spaced apart from and opposite to each other in the lateral direction, the barrier cuff sheets each include: a proximal portion positioned on an outer side of the absorbent core in the lateral direction and is fixed to the inner layer sheet; a distal portion positioned on an inner side of the proximal portion in the lateral direction and is able to be spaced apart from the inner layer sheet; and a rear end fixing member positioned in the back facing region, and the recessed-and-protruded region is positioned between a pair of the rear end fixing members that are spaced apart from each other and are opposite to each other in the lateral direction.

(5) A strip shaped elastic member extending in the lateral direction is disposed between the absorbent core and the outer layer sheet in the belly facing region, and is not bonded with the inner layer sheet and the absorbent core.

The invention claimed is:

1. An absorbent article for a pet comprising:
   a longitudinal direction and a lateral direction;
   a body facing surface and a non-body facing surface opposite to each other;
   a belly facing region;
   a back facing region;
   an intermediate region positioned between the belly facing region and the back facing region in the longitudinal direction;
   a liquid permeable inner layer sheet;
   a liquid impermeable outer layer sheet; and
   an absorbent core provided between the inner layer sheet and the outer layer sheet,
   wherein the absorbent core is provided only in a portion closer to the belly facing region than a cutting line in which a tail of the pet is inserted, the cutting line being positioned in the intermediate section, and
   wherein the body facing surface of the inner layer sheet has an area, at least overlapping the absorbent core in plan view, in which a recessed-and-protruded region is positioned, the recessed-and-protruded region including ridges and grooves that are alternately arranged side by side in the lateral direction while extending in the longitudinal direction, and the cutting line partially extends so as to cross a plurality of ridges and a plurality of grooves.

2. The absorbent article according to claim 1, wherein the recessed-and-protruded region extends between one end edge and another end edge of the absorbent article in the longitudinal direction.

3. The absorbent article according to claim 1,
wherein the inner layer sheet is formed of fiber nonwoven fabrics, and
wherein the ridges have a lower fiber density than the grooves.

4. The absorbent article according to claim 1 further comprising a pair of barrier cuff sheets positioned on the body facing surface of the inner layer sheet and spaced apart from each other in the lateral direction,
wherein the barrier cuff sheets each include:
- a proximal portion positioned on an outer side of the absorbent core in the lateral direction and fixed to the inner layer sheet;
- a distal portion that is positioned on an inner side of the proximal portion in the lateral direction and is able to be separated from the inner layer sheet; and
- a rear end fixing member positioned in the back facing region, and wherein the recessed-and-protruded region is positioned between a pair of the rear end fixing members spaced apart from each other and are opposite to each other in the lateral direction.

5. The absorbent article according to claim 1, wherein a strip elastic member extending in the lateral direction is disposed between the absorbent core and the outer layer sheet in the belly facing, and is not bonded with the inner layer sheet and the absorbent core.

* * * * *